United States Patent
Lam et al.

(10) Patent No.: US 6,675,303 B1
(45) Date of Patent: Jan. 6, 2004

(54) PC CARD CONTROLLER WITH ADVANCED POWER MANAGEMENT RESET CAPABILITIES

(75) Inventors: James Lam, Fremont, CA (US); Yishao Max Huang, San Jose, CA (US); Rajesh B. Koilada, San Jose, CA (US); Jeng-Luen Allen Li, San Jose, CA (US)

(73) Assignee: 2Micro International Limited, Georgetown (KY)

( * ) Notice: Subject to any disclaimer, the term of this patent is extended or adjusted under 35 U.S.C. 154(b) by 417 days.

(21) Appl. No.: 09/667,644

(22) Filed: Sep. 22, 2000

Related U.S. Application Data
(60) Provisional application No. 60/156,811, filed on Sep. 29, 1999.

(51) Int. Cl.$^7$ ................................................. G06F 1/26
(52) U.S. Cl. ........................... 713/320; 713/300; 713/1
(58) Field of Search ................................. 710/300, 301; 713/300–340, 1

(56) References Cited

U.S. PATENT DOCUMENTS

| | | | |
|---|---|---|---|
| 5,008,846 A | 4/1991 | Inoue | 364/707 |
| 5,019,996 A | 5/1991 | Lee | 364/483 |
| 5,396,635 A | 3/1995 | Fung | 395/800 |
| 5,630,090 A | 5/1997 | Keehn et al. | 395/433 |
| 5,809,312 A | 9/1998 | Ansel et al. | 395/750.01 |
| 5,878,264 A | 3/1999 | Ebrahim | 395/750.05 |
| 6,085,327 A | 7/2000 | Seng et al. | 713/300 |
| 6,295,566 B1 * | 9/2001 | Stufflebeam | 710/302 |
| 6,351,819 B1 * | 2/2002 | Berglund et al. | 713/310 |
| 6,393,570 B1 * | 5/2002 | Henderson et al. | 713/310 |
| 6,473,810 B1 * | 10/2002 | Patel et al. | 710/7 |

* cited by examiner

Primary Examiner—Glenn A. Auve
Assistant Examiner—X. Chung Trans
(74) Attorney, Agent, or Firm—Grossman Tucker Perreault & Pfleger, PLLC

(57) ABSTRACT

A power management PC expansion card controller that includes power on reset circuitry to reset power management enable registers during a reset period, thereby ensuring that the PME registers correctly identify the power management capabilities of the controller. Once the PME registers are reset, an instruction may be provided to change the state of the registers from a default reset state to a state that supports advanced power management capabilities, for example wake-up functions. Additionally, the controller includes blocking circuitry to block conventional reset signals from resetting the power management and proprietary registers if the PME register is instructed to change states, thereby preserving the data contained in the power management and proprietary registers against future reset events. The controller of the present invention supports advanced power management specifications without requiring additional pinout arrangement or reassignment of pin functionality, so that the controller of the present invention can be implemented in current computer system without a the need for retooling or re-layout of system board circuitry and wiring diagrams.

25 Claims, 5 Drawing Sheets

PC CARD CONTROLLER WITH ADVANCED POWER MANAGEMENT RESET CAPABILITIES

This application claims the benefit of Provisional Application No. 60,156,811, filed Sep. 29, 1999.

BACKGROUND OF THE INVENTION

1. Field of the Invention

The present invention relates to a PC card controller having advanced power management and register reset capabilities. More particularly, the present invention relates to a PC card controller that support register reset capabilities for advanced power management modes. Particular utility of the present invention is a cardbus controller supporting advanced power management capabilities for a plurality of expansion cards for portable computer devices; although other utilities are contemplated herein.

2. Description of Related Art

Figure 1:
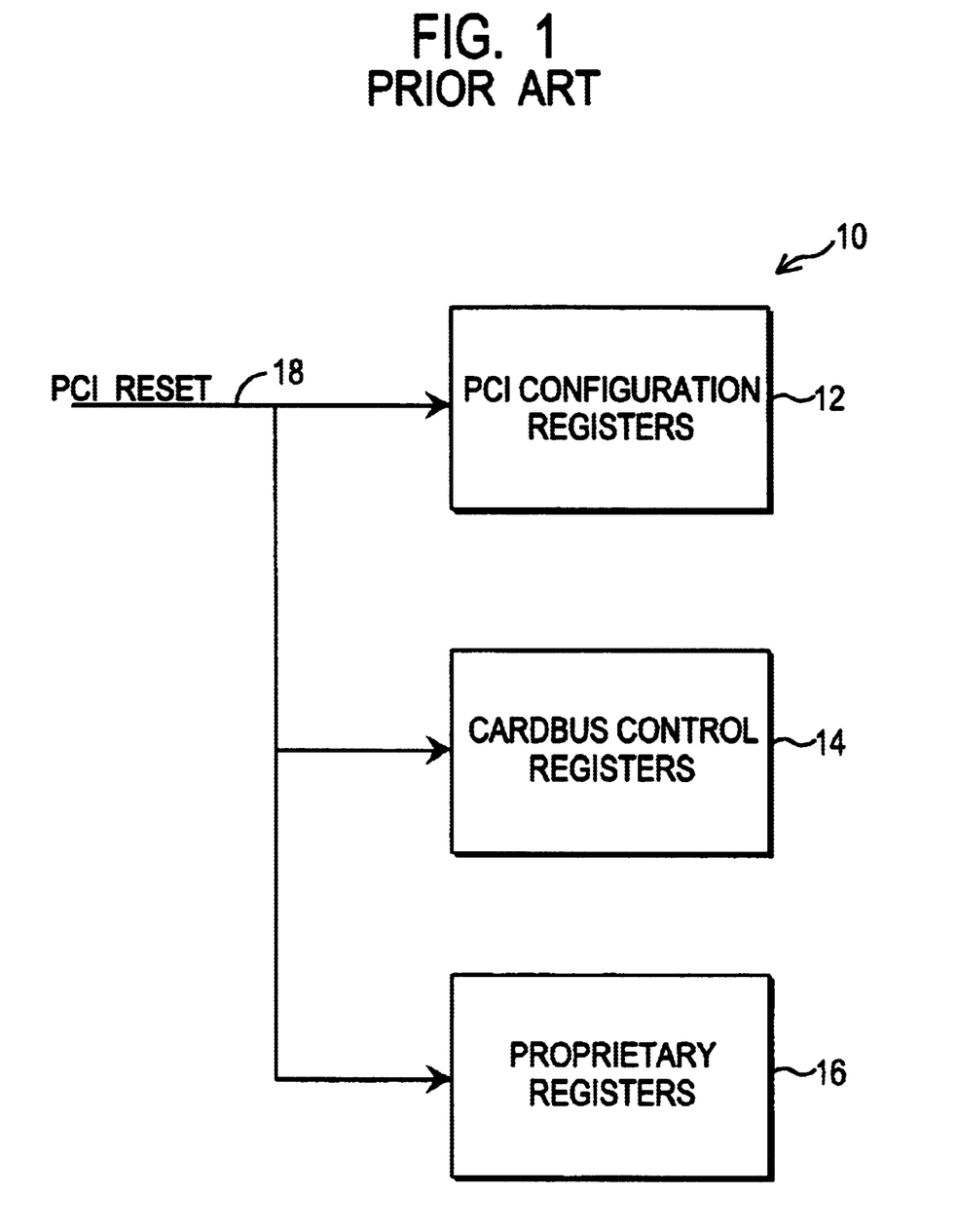
FIG. 1 depicts a block diagram of registers in a conventional PC card controller.

Conventionally, prior to power management specifications, PCI devices in portable notebook computers supported the following power states: (1) power on state, (2) power off state, (3) low power (sleep) state accomplished by turning off internal clock signals and (4) a suspended state by powering off most of the system power. However, this approach has numerous limitations. For example, a device which has an internal clock (for example, an internal PLL generated clock) may take an extended time to bring the clock back on to a powered state before the device can be accessed. Also, since the operating system (OS) normally has no data about the status of various devices, the OS may falsely interpret the timed out device as failed. FIG. 1 depicts conventional registers 12, 14 and 16 of a conventional Cardbus controller 10. Conventional registers include: PCI configuration registers 12 that provide interface information between the controller 10 and a PCI bus, Cardbus control registers 14 that generate internal instructions and commands for cardbus control, and proprietary registers 16 (implemented by the specific design manufacturer of the controller which may include general I/O registers, specific pinout registers, etc.). In the conventional controller 10, a PCI reset signal is used to reset registers 12, 14 and 16. In conventional cardbus controllers, numerous cardbus devices could not be put into a power saving mode at all since these controllers do not support power management specifications.

To remedy these defects, Microsoft Corporation defined a series of protocols known as the ACPI (Advanced Configuration and Power Interface Specifications). Likewise, the PCI committee defined the PCI power management specification to tackle these problems. To be harmonious with the specifications, the PCMCIA committee (also based on the PCI power management specification) defined the cardbus power management specification so that most of the PCI devices (including cardbus controllers) used in portable computers are modified to adapt advanced power management specifications.

In the PCI power management specification, the PCI bus is defined into D0, D1, D2, D3_HOT and D3_COLD states. Legacy PCI devices typically automatically support D0 (power on) and D3_COLD (power off) states. The D1, D2 and D3_HOT states are varying levels of power saving states advanced under these specifications. In general, the D1 states consumes less power than the D0 state, the D2 state consumes less power than the D1 state, and so on. Included in the PCI power management specifications is a new power supply, commonly known as AUXVCC which is added in the D3_COLD state. The AUX VCC is a new power definition which can be used to maintain certain logic when the main source, known as PCI VCC, is in an off state. Thus, AUX VCC was added to maintain certain logic at a predefined minimum value while permitting the rest of the system to be turned off. To maintain certain information in certain registers, AUX VCC supplies power to these registers to permit wake up and identification when the system is switched from D3_COLD state to D0 state. To properly wake up the system from a D3_COLD state back to a D0 state, some of the power management and proprietary registers need to maintain data therein to instruct the operating system properly, so that upon a wake up command the operating system can identify which device has instructed a wake up.

When the controller receives a request to wake up from the D3_COLD state back to the D0 state, the AUX VCC signal permits the appropriate power management registers to remain active and process this request. Thus, the operating system receives the proper information from the devices seeking this request. In conventional cardbus controllers, the power management and proprietary registers block system resets when the requesting devices goes from a D3_COLD state (to another state) by checking the power state registers. However, if the system is powered up from a total power off state, cardbus devices have difficulty determining whether the data contained in the power state registers are correct, or just random values. A typical example in the cardbus controller is the cardbus socket power registers. Since there are different types of PC cards, and if the socket power is not initialized correctly, the controller may erroneously apply a 5 volt power to a 3 volt card, which can damage the card before the bios determines the error. Thus, there is a recognized need to properly reset the power management and proprietary registers when the system is powered up from a total power off state.

The simplest way to accomplish a power up reset would be to provide an additional pin on the controller and use that as a global reset of the appropriate registers. However, this requires a pin assignment change. Given the vast amount of installations of cardbus controllers in computer systems, this would be an undesirable fix since it would require wiring and tooling changes to accommodate the additional pin. Moreover, cardbus controller technology is a mature technology, and different manufacturers implement different pin configurations and most of the pins are multiplexed to perform different functions so that pin out arrangements are at a minimum. Thus, there is a need to provide a cardbus controller that includes power on reset capabilities to reset the PCI and cardbus power management registers and proprietary registers without any changes in pin assignments or wiring layouts.

SUMMARY OF THE INVENTION

Accordingly, it is an overall object of the present invention to provide a cardbus controller that supports advanced power management specifications without requiring additional pinout arrangement or reassignment of pin functionality, so that the controller of the present invention can be implemented in current computer system without a the need for retooling or re-layout of system board circuitry and wiring diagrams.

It is one object of the present invention to provide a cardbus controller that includes power on reset circuitry to reset power management enable (PME) registers during a reset period, thereby ensuring that these registers correctly identify the power management capabilities of the controller.

It is another object of the present invention to provide a cardbus controller that includes blocking circuitry to block conventional reset signals from resetting power management registers after an initial reset period.

Broadly, the present invention provides a PC card controller, comprising power management enable (PME) registers, a trigger signal that changes state when power is first applied to the power management enable registers, and power on reset circuitry that receives the trigger signal and generates a first reset signal to reset the PME registers when power is first applied to the PME registers.

In one exemplary embodiment, the present invention also provides a CardBus controller, comprising power management enable (PME) registers; PCI and CardBus power management registers; a trigger signal that changes state when power is first applied to the PME, PCI and Cardbus registers; and power on reset circuitry receiving the trigger signal and generating a first reset signal to reset the PME registers.

In preferred embodiments, the present invention includes blocking circuitry that receives a conventional reset signal for the PCI and CardBus registers, and a control signal indicative of the state of the PME registers. The blocking circuitry generates a second reset signal to reset the PCI and CardBus registers. If the control signal is disabled, the blocking circuitry generates the second reset signal to reset the PCI and CardBus registers based on the conventional reset signal. If the control signal is enabled, the blocking circuitry disables the second reset signal to prevent additional resets of the PCI and CardBus registers, regardless of the sate of the conventional reset signal.

The present invention also provides a method for resetting one or more registers of a PC card controller, comprising the steps of: choosing a triggering signal that changes power levels when power is first applied to power management enable (PME) registers; generating a reset signal based on said triggering signal; and resetting said PME registers using said reset signal.

In some preferred embodiments, the method further comprises the steps of: generating a second reset signal; and resetting power management registers with said second reset signal. The method may further include the steps of generating a control signal indicative of the reset state of said PME registers; and ANDing said first control signal and a conventional reset signal and generating said second reset signal. Also, the method may include the steps of: instructing the reset PME register to change state; changing the state of said control signal; and blocking additional resets of said power management registers.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Figure 2:
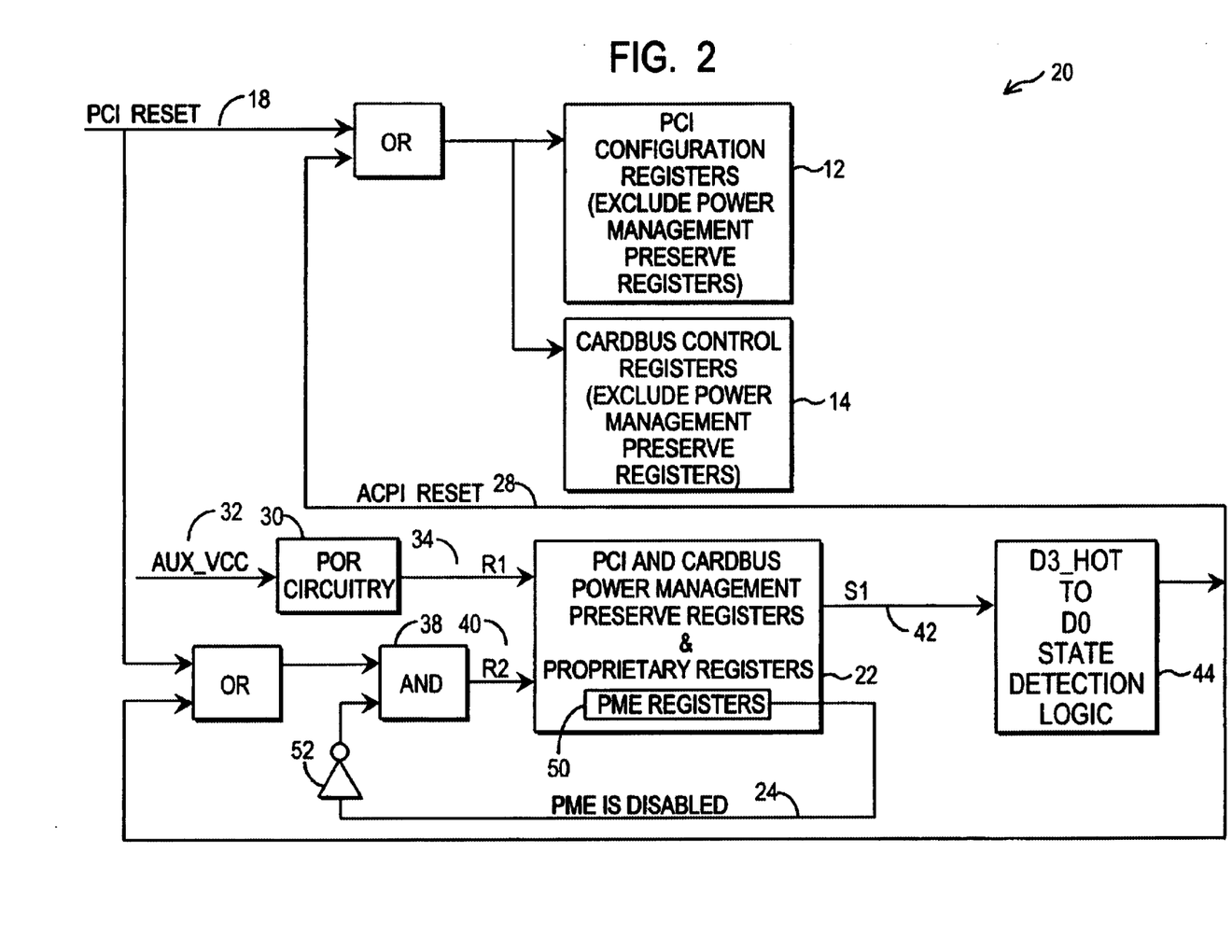
FIG. 2 is a system-level block diagram of relevant portions of the controller of the present invention that supports advanced power management specifications and includes power on reset circuitry to reset certain registers during power on periods.

FIG. 2 depicts an exemplary block diagram of the cardbus controller 20 of the present invention that supports advanced power management specifications (such as provided by the ACPI specifications) and includes power on reset management. Generally, controllers that support power management specifications include conventional PCI configuration registers 12, Cardbus control registers 14, and PCI and cardbus power management registers 22, and PME enable registers 50. Registers 22 are provided to identify and specify advanced power management protocols, such as the D0, D1, D2, and D3 states, discussed above. Registers 22 may also include proprietary registers, as may be provided by a specific manufacturer, for example the OZ6833 cardbus controllers manufactured and sold by O2Micro International Limited. The PME enable registers 50 provide wake-up functionality for the advanced power management operating modes. An instruction form the operating system enables these registers, OS input 56, thereby permitting the PCI and Cardbus power management registers 22 to support wake-up functionality (distinct from the power modes D0, D1, D2, D3_hot and D3_cold, described above).

Upon a reset or initial power on event (i.e., when AUXVCC changes state from low to high), the POR circuitry 30 uses AUXVCC as a trigger signal to generate reset signal 34 R1. R1 resets the PME enable registers 50 to their initial or default state. By default, registers 50 generate a signal 24 (low) that indicates the power management events (PME) are disabled (i.e., wake-up functions are not supported). Also on power on, the PCI reset signal 18 is asserted (active high) to, among other things, reset registers 12 and 14. Using inverter 52 and AND gate 38, registers 22 are reset by R2, which is the PCI reset signal 18. The instruction to support PME is provided by the operating system, via OS input 56, to the PME enable registers 50. If such an instruction is sent to the registers 50, signal 24 changes state from disable (low) to enabled (high). Therefore, registers 22 can no longer be reset by the assertion of the PCI reset signal 18, and thus, these registers are protected during normal operation. Thus, the present invention provides reset of registers 50 and 22 during power on or initialization periods, ensuring the accuracy of the data in these registers, and blocks the reset of registers 22 during normal operations to protect the data in these registers.

Preferably, reset of the registers occurs utilizing an existing signal so that additional pins are not required for the controller 20. To that end, the present invention includes power on reset (POR) circuitry 30 that generates a reset signal R1 (34) to reset the PME registers 50, based on a signal available during power on periods. In the preferred embodiment, the POR circuitry generates the reset signal 34 based on the AUXVCC signal, defined by the ACPI specification. This signal is preferable since it does not change state once a reset period is over. Generally, power on reset is defined as a time when the controller goes from no power being supplied to the controller 20, including PCI_VCC (not shown) and AUXVCC 32, such as may be the case when the computer system (within which the controller 20 of the present invention is installed) is not plugged in or lacks battery power, to when power is first applied. As noted above, when these registers are initially powered up, the data contained therein is not trustworthy. Thus, it is intended that if the controller 20 is adapted to comply with advanced power management specifications (ACPI), registers 22 require resetting during this time period (for example off to D0 state) and no reset thereafter (for example D3_cold to D0 state), until a power on period occurs again. Of course, those skilled in the art will recognize that other signals may be utilized to accomplish reset of the registers 22, and the use AUXVCC as the reset trigger is only provided as an example.

As used herein, power management registers 22 include PCI power management preserve registers and/or Cardbus power management registers and/or proprietary registers. These registers, as is understood in the art, define various power management capabilities (e.g., D0, D1, D2, D3_hot and D3_cold power management states), as well supply voltage (e.g., 5V, 3.3V, 3V, etc) and power requirements of PC cards controlled by the present invention. Also, although the following examples are defined for a Cardbus controller, it is to be noted that the controller of the present invention can be adapted for any type of PC expansion card technology, including, for example, conventional PCMCIA, SmartCard, etc.

Figure 3:
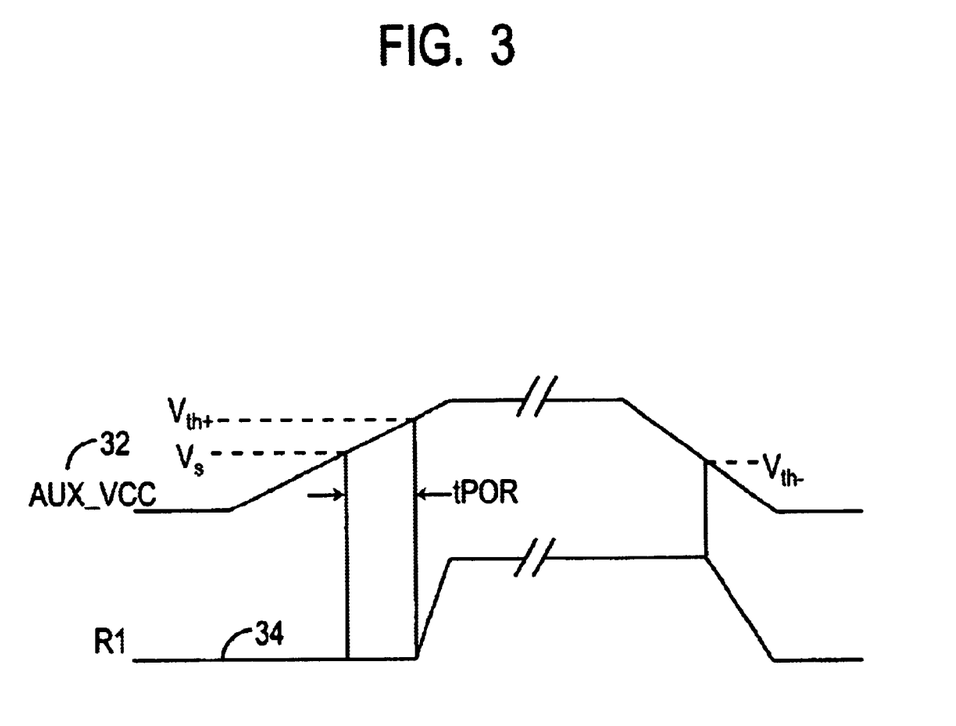
FIG. 3 is an exemplary timing diagram for generating a power on reset signal in the power on reset circuitry of FIG. 2.

FIG. 3 depicts a timing diagram for the POR circuitry 30. At an initial power on period, the AUXVCC 32 signal changes from low to high as shown. During the ramp-up period of signal 32, POR circuitry 30 generates a reset signal 34 (R1), as described below. The relevant portions of the AUXVCC signal during ramp up include $V_s$ and $V_{th}$. Since it is important that the reset signal R1 is applied before AUXVCC becomes active, the reset signal is applied before the threshold voltage $V_{th}$ of AUXVCC (i.e., before AUXVCC can be considered high by the appropriate logic). $V_s$ defines the start period for the reset signal and is generally triggered by sufficient voltage on the AUXVCC signal. The time period between $V_s$ and $V_{th}$ defines the time period, tPOR, in which the power on reset signal is generated. In this example, R1 is active low since typically PME registers require an active low reset signal. If PME registers 50 require an active high signal, the POR circuitry may be adapted with an inverter. The POR circuitry 30 can include RC circuitry that is adapted to trigger at the threshold voltage $V_{th}$, as shown in FIG. 2. However, those skilled in the art will recognize that other circuitry may be used to generate signals similar to that shown in FIG. 2, and all such circuitry is deemed equivalent to the present invention.

Referring again to FIG. 2, R1 is generated in the manner described above to reset the PME enable registers 50. By default, PME is disabled, and these registers generate a disabled (low) signal 24. Inputs to AND gate 38 are the PCI reset signal 18 and the PME signal 24. If, at some later time, the operating system directs the controller to support wake-up functions, a signal is sent to the PME enable registers 50, via OS signal input 56, to enable the PME enable register. In response thereto, the PME enable register 50 changes the state of the enable signal 24 from low (disabled) to high (enabled). After this time, the output of the AND gate 38 is always low, and thus a PCI reset cannot reset registers 22 (since R2 is low regardless of the state of the PCI reset signal). This ensures that registers 22 and registers 50 are not reset by a future application of a PCI reset signal.

Once the controller is identified as having advanced power management capabilities, and once registers 22 and 50 are reset at power on, registers 22 operate to control the advanced power management states: D0, D1, D2, D3_hot and D3 cold. Although not necessary for an understanding of the present invention, FIG. 2 also depicts the generation of internal reset signals for certain power management states required by the ACPI specification. If, for example, the controller is instructed to enter a D3_hot state, registers 22 control the cardbus controller to enter this state. If the state is changed, for example from D3_hot to D0, registers 22 generate a wake signal 42 to logic 44. Logic 44 receives this wake signal, and in turn generate an ACPI reset signal 28. ACPI reset signal is an internal reset signal that resets the PCI configuration registers 12, and the cardbus control registers 14 when there is a request to change from D3_hot to D0 states. If the PME signal 24 remains disabled, ACPI reset signal 28 also resets the PCI and Cardbus power management registers and proprietary registers 22.

Figure 4:
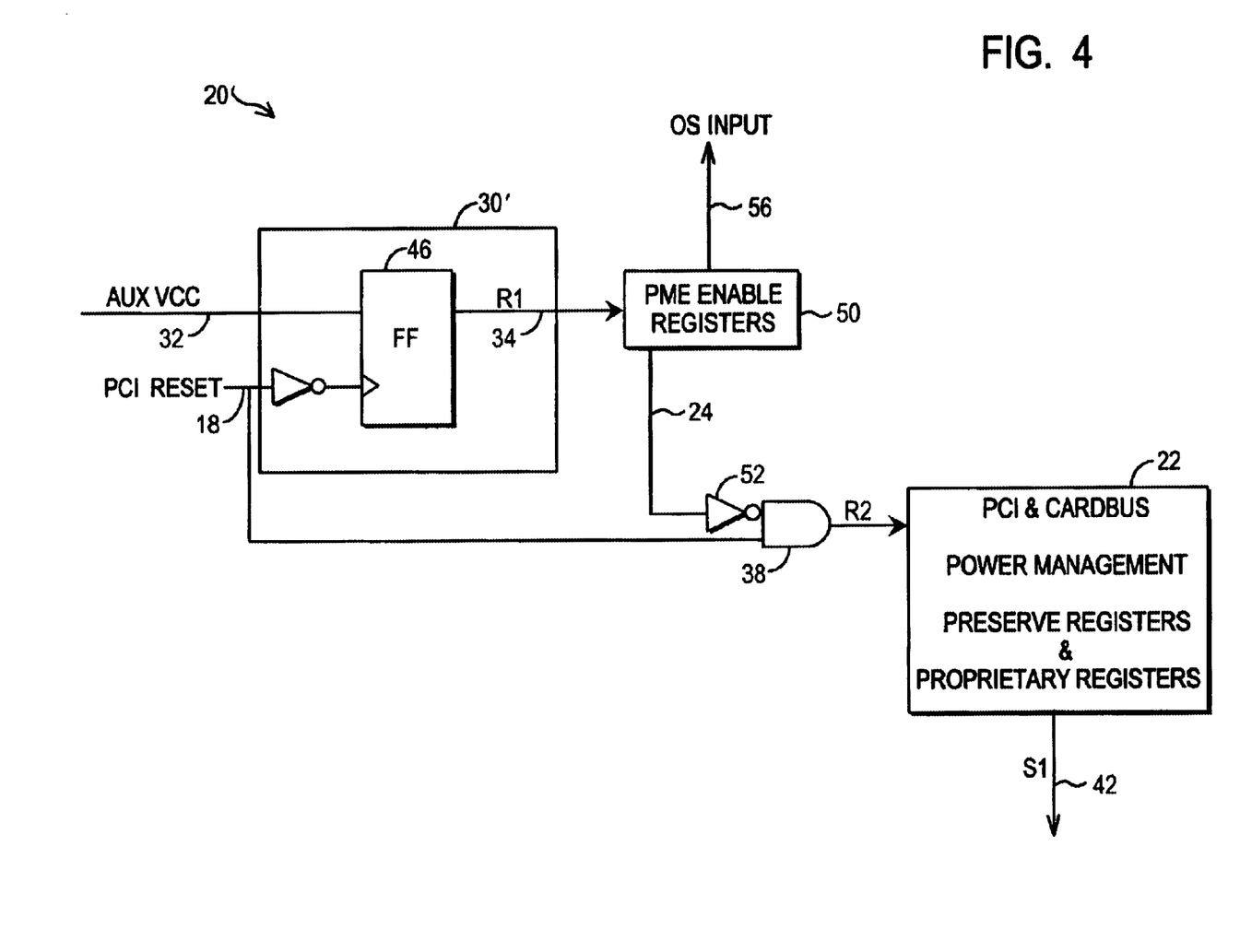
FIG. 4 is an alternative example of power on circuitry used by the controller of FIG. 2.

FIG. 4 depicts a cardbus controller 20' and another example of POR circuitry 30'. In this example, the POR circuitry 30' is comprised of a flip-flop circuit 46 that generates R1 34 based on the states of AUXVCC 32 and PCI reset 18. In this example, PCI reset is used as the trigger for the flip-flop 46. Otherwise, the remaining portions of the circuit operate identically to the circuit shown in FIG. 2. Since the state of PCI reset can and will change during normal operations, and since the state of AUXVCC only changes state upon a power on condition, it is important to configure the flip-flop such that once the reset signal changes state twice, the output R1 is always the same until of course, another power on event occurs), to prevent continuous resetting of the PME enable registers. Upon an initial power event PCI reset is initially asserted to reset the power management registers 22. After a predetermined time, the PCI reset signal is de-asserted. At this event, R1 must also be de-asserted, until AUXVCC is reasserted (i.e., until power is removed from and reapplied to the controller). Alternatively, the AUXVCC signal can be used as the trigger signal, and additional timing circuitry (not shown) can be added so that after a predetermined time R1 is disabled as a reset.

Figure 5:
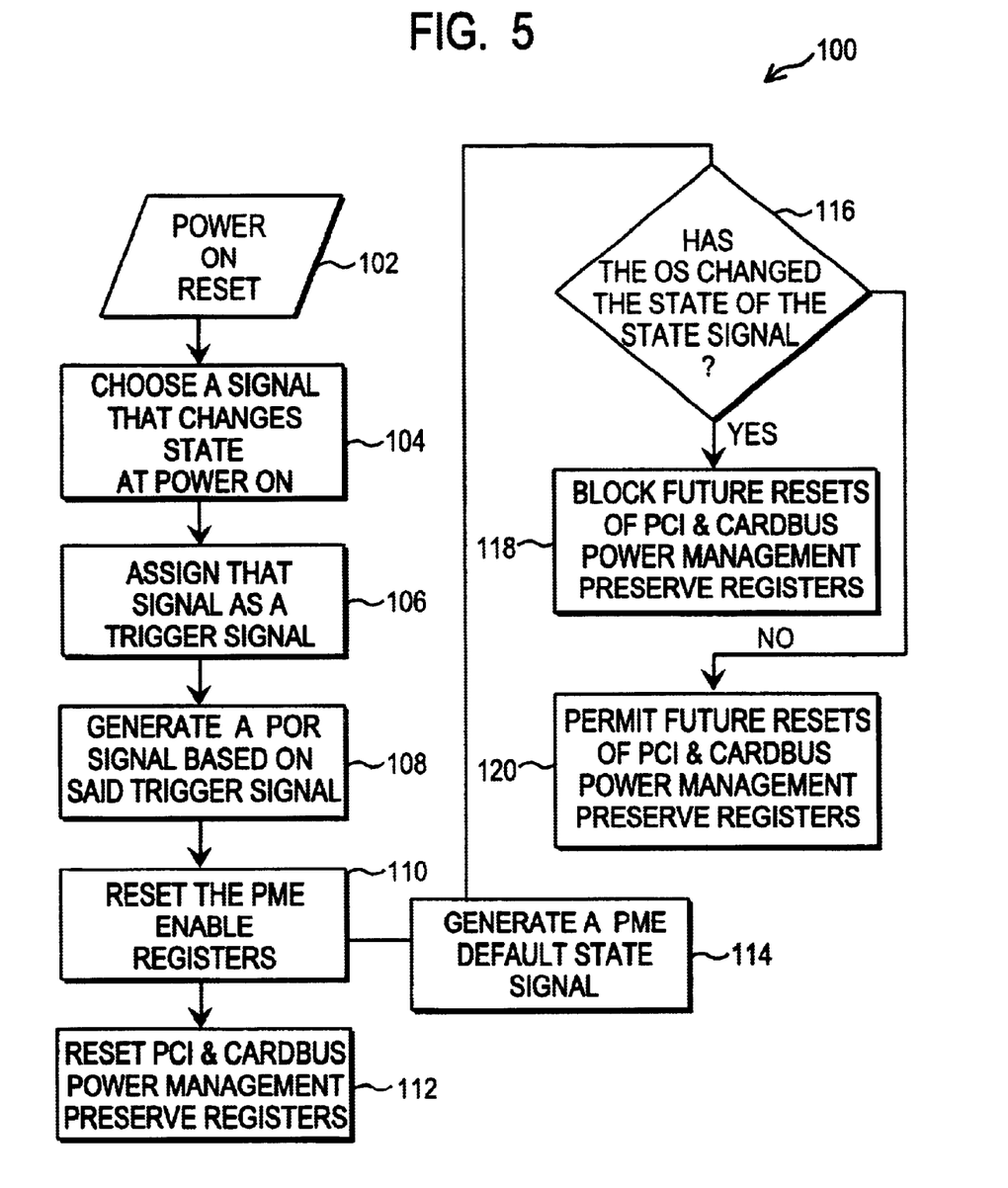
FIG. 5 is an exemplary flowchart depicting the process of generating a power on reset signal according to the present invention.

FIG. 5 is a flowchart 100 of the preferred Power On Reset operation of the cardbus controller 20 or 20' of the present invention. The process starts with a power on reset 102, as described above. A signal is chosen that changes state during the power on period 104. Since this applications is directed to a methodology for resetting from a total power off condition, most, if not all, signals associated with the cardbus controller would meet this requirement. Thus, it is desirable to also choose a signal that does not change state once the power up period is over. In the preferred embodiment this signal is the AUXVCC signal, although other signals meeting these criteria may be chosen instead. The signal chosen in step 104, e.g., the AUXVCC signal, is assigned as the trigger signal 106. Using the AUXVCC signal as a trigger, a POR (power on reset) signal is generated 108. The POR signal resets the PME enable registers 110, and the PME default state signal (or flag signal) is thereby generated 114. Also, the power management and proprietary registers are reset by the POR signal 112. The state of the PME default signal does not change states unless instructed to do so, for example via an instruction sent by the operating system (OS). The controller determines if the OS has changed the state of the PME default state signal 116. If the state is changed, then the controller blocks future resets of the power management and proprietary registers 118. If the PME signal does not change states, the controller permits future additional resets of the power management and proprietary registers 120.

Thus, the controller of the present invention satisfies the aims and objectives stated herein by providing power on reset management for PCI and cardbus power management registers (and proprietary registers) utilizing an existing cardbus controller pin assignment. Thus, the use of additional pins and/or re-wiring of system components is avoided. Those skilled in the art will recognize that numerous modifications may be made to the present invention. For example, the description of the block diagrams of FIGS. 2 and 4 assumes that the reset signal R1 is active low. However, an active high signal may be used instead (if required) by inverting the R1 signal. As a general statement, the exemplary states of the signals described herein may be changed, based on the specific requirements.

Those skilled in the art will also recognize that only the relevant portions of the cardbus controller are depicted in the Figures. Of course, the cardbus controller would include other conventional components such as PCI interface circuitry to exchange commands and data between the controller and a host computer system along a PCI bus. Also, PC card access logic would be included, which may comprise cardbus access control logic and/or conventional PC card access control logic (e.g., PCMCIA TypeI/II/III) and/or other PC expansion card technology. Moreover, those skilled in the art will recognize that specific integrated circuit implementation of the concepts herein described may require proper buffering and/or biasing to meet power consumption requirements.

These and other modifications are deemed within the spirit and scope of the present invention, only as limited by the appended claims.

What is claimed is:

1. A PC card controller, comprising:
   power management event enable (PME) registers, said PME registers being reset to a default state and generating a control signal indicative of said default state, and said PMF registers adapted to receive instruction to change from a default state to a different state and generating a control signal indicative of said different state;
   power management registers;
   a trigger signal that changes state when power is first applied to said PME registers;
   power on reset circuitry receiving said trigger signal and generating a first reset signal to reset said PME registers when said power is first applied to said PME registers, and generating a second reset signal to reset said power management registers when said power is first applied to said power management registers; and
   blocking circuitry receiving a conventional reset signal for said power management registers and said control signal and generating said second reset signal, wherein once said control signal indicates a different state, said blocking circuitry preventing said power management registers from being reset by said conventional reset signal.

2. A controller as claimed in claim 1, wherein said default state comprising a state that does not support wake-up functions and said different sate comprising a state that supports wake-up functions.

3. A controller as claimed in claim 1, wherein said power management registers comprise PCI and CardBus power management preserve registers and proprietary registers, and said conventional reset signal comprises a PCI reset signal.

4. A controller as claimed in claim 1 wherein said blocking circuitry comprising an AND gate receiving said conventional reset signal for said power management registers and said control signal and generating said second reset signal.

5. A controller as claimed in claim 1, wherein said instruction being generated by an operating system in communication with said PME registers, wherein said default state being defined as a state where power management events are disabled, and said instruction from said operating system changing the state of said PME registers to enable power management events.

6. A controller as claimed in claim 1, wherein said power on reset circuitry adapted to generate said reset signal before said trigger signal reaches a predetermined threshold power level.

7. A controller as claimed in claim 6, wherein said trigger signal comprises an AUXVCC signal, and said circuitry comprising an RC circuit chosen to generate said first reset signal.

8. A controller as claimed in claim 1, wherein said power on reset circuitry comprising a flip-flop circuit, said trigger signal is a conventional reset signal, and wherein said flip-flop adapted to receive said trigger signal and a signal that changes state only when said power is first applied to said registers and generate said first reset signal.

9. A controller as claimed in claim 8, wherein said trigger signal comprising a PCI reset signal, said PCI reset signal changing states when said power is first applied to said register and thereafter changing states based on external reset commands and wherein once said PCI reset signal changes state twice, said flip-flop circuit being adapted to permanently disable said first reset signal until said signal changes state again when said power is first applied to said system.

10. A controller as claimed in claim 1, wherein said power on reset circuitry adapted to generate said first reset signal and reset said PiM registers only when power is first applied to said registers.

11. A method for resetting one or more registers of a PC card controller, said method comprising the steps of:
   choosing a triggering signal that changes power levels when power is first applied to power management event enable (PME) registers;
   generating a reset signal based on said triggering signal;
   resetting said PME registers using said reset signal;
   generating a second reset signal;
   resetting power management registers with said second reset signal;
   generating a control signal indicative of the reset state of said PME registers;
   instructing the reset PME register to change state;
   changing the state of said control signal; and
   blocking additional resets of said power management registers.

12. A method as claimed in claim 11, further comprising the steps of:
   generating a control signal indicative of the reset state of said PME registers; and
   ANDing said first control signal and a conventional reset signal and generating said second reset signal.

13. A method as claimed in claim 11, further comprising the steps of:
  defining a predetermined threshold voltage level for said trigger signal;
  generating said reset signal based on said predetermined threshold voltage level.

14. A method as claimed in claim 11, further comprising the steps of:
  choosing a conventional reset signal;
  inputting said conventional reset signal and said trigger signal into a flip-flop; and
  generating said reset signal until a trigger of said flip-flop changes state twice from an initial state.

15. A CardBus controller, comprising power management event enable (PME) registers; PCI and CardBus power management registers; a trigger signal that changes state when power is first applied to said PME registers, PCI and Cardbus registers; power on reset circuitry receiving said trigger signal and generating a first reset signal to reset said PME registers; wherein said PME registers receiving said reset signal and generating a power management signal, wherein if said power management signal is enabled said power management registers being capable of advanced power management states, and if said power management signal is disabled said power management registers not being capable of advanced power management states;
  further comprising blocking circuitry receiving said power management signal and a conventional reset signal and generating a second reset signal for resetting said PCI and Cardbus registers; wherein said blocking circuitry configured so that if said power management signal is disabled and said conventional reset signal is enabled, said second reset signal is enabled; and further configured so that if said power management signal is enabled and said conventional reset signal is enabled or disabled, said second reset signal is disabled.

16. A controller as claimed in claim 15, said blocking circuitry comprising an AND gate receiving said conventional reset signal and said power management signal and said second reset signal.

17. A controller as claimed in claim 16, said AND gate configured so that said second reset signal is active if said power management signal is disabled and said conventional reset signal is active.

18. A controller as claimed in claim 16, said AND gate configured so that said second reset signal is not active if said power management signal is enabled.

19. A controller as claimed in claim 15, wherein said conventional reset signal comprising a PCI reset signal.

20. A controller as claimed in claim 15, wherein said trigger signal is the AUXVCC signal defined by the advanced power management specification (ACPI).

21. A controller as claimed in claim 15, wherein said power on reset circuitry adapted to generate said reset signal before said trigger signal reaches a predetermined threshold power level.

22. A controller as claimed in claim 21, wherein said trigger signal comprises an AUTXVCC signal, and said circuitry comprising an RC circuit chosen to generate said first reset signal.

23. A controller as claim 15, wherein said power on reset circuitry comprising a flip-flop circuit, said trigger signal is a conventional reset signal, and wherein said flip-flop adapted to receive said trigger signal and a signal that changes state only when said power is first applied to said registers and generate said first signal.

24. A controller as claimed in claim 23, wherein said trigger signal comprising a PCI reset signal, said PCI reset signal changing states when said power is first applied to said register and thereafter changing states based on external reset commands and wherein once said PCI reset signal changes state twice, said flip-flop circuit being adapted to permanently disable said first reset signal until said signal changes state again when said power is first applied to said system.

25. A controller as claimed in claim 15, wherein said power on reset circuitry adapted to generate said first reset signal and reset said PME registers only when power is first applied to said registers.

* * * * *